S. V. GREER.
Animal-Traps and Seed-Safes Combined.
No. 140,773.  Patented July 15, 1873.
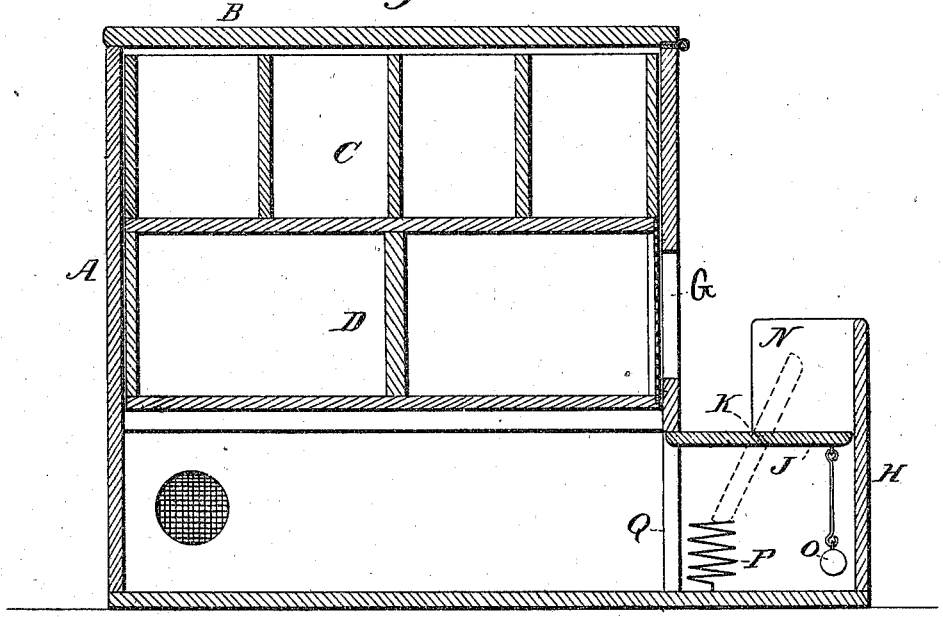
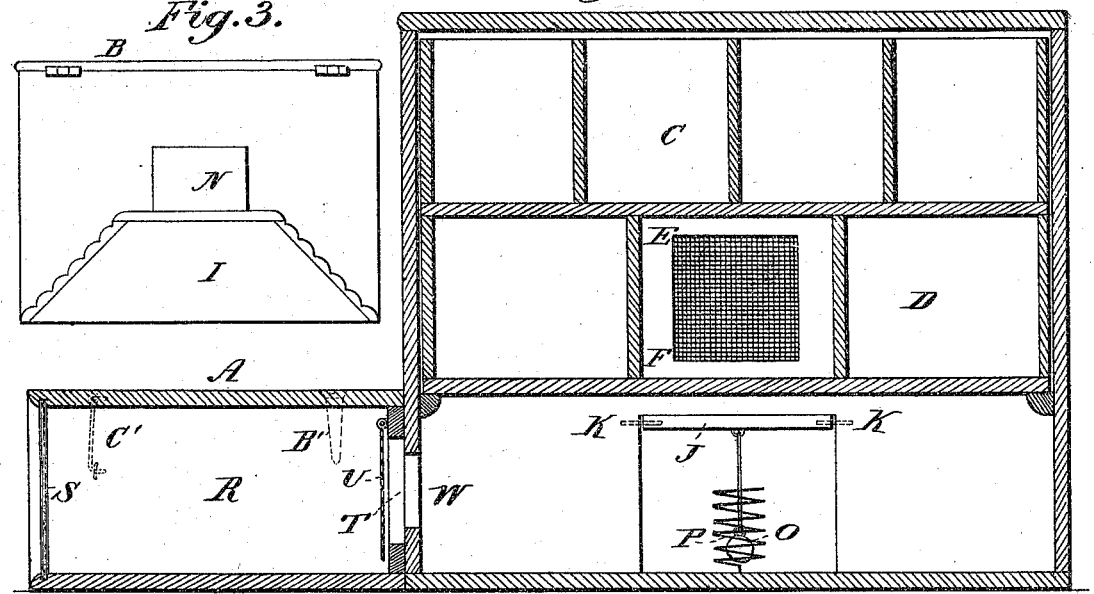

UNITED STATES PATENT OFFICE.

SAMUEL V. GREER, OF ROCKY HILL STATION, KENTUCKY.

IMPROVEMENT IN ANIMAL-TRAPS AND SEED-SAFES COMBINED.

Specification forming part of Letters Patent No. 140,773, dated July 15, 1873; application filed April 19, 1873.

*To all whom it may concern:*

Be it known that I, SAMUEL V. GREER, of Rocky Hill Station, in the county of Edmondson and State of Kentucky, have invented a new and useful Improvement in Seed-Safe and Rat-Trap Combined; and I hereby declare the following to be a full, clear, and exact description of the same, reference being had to the accompanying drawing making part of this specification, in which—

Figure 1 is a longitudinal vertical section, Fig. 2 is a transverse vertical section, and Fig. 3 is a rear elevation, of the combined seed-safe and rat-trap.

This invention relates to an improvement in seed-safe and rat-trap combined; and consists of a safe, having one or more movable cases, provided with a series of labeled compartments, for the reception of seeds, in combination with a rat-trap, the several parts being arranged in such a manner that the more tempting seed may be placed and displaced as a bait to lure the rats, which, while attempting to get the seed, walk upon the drop of the trap and are precipitated therefrom into the safe beneath the seed-cases, from which they have egress into a box provided with a glass window, and secured to the outside of the safe, in order that they may be the more readily destroyed.

In the drawing, the safe A is provided with a lid, B, and seed-cases C and D, one above the other, having labeled compartments for the reception of the various kinds of seed. The seed-case D has the rectangular opening E covered with wire-cloth F. A rectangular opening, G, in the rear side of the safe A, corresponds with the opening E in the seed-case D. The rat-trap H is erected at, and secured to, the rear side of the safe A. It consists of a box, I, having corrugated ends sloping inwardly from the bottom toward the top, and a drop, J, swinging on pivots K, and covered with a glass plate. Glass plates extend to nearly the ends of the top of the box I. A wall, N, partially surrounds the drop J. The parallel sides of the wall N extend a short distance in front of the pivots K. A weight, O, depending from the rear of the drop J, holds it in position, when no weight is upon it, in front of the pivots K. A spiral spring, P, is secured to the bottom of the box I beneath the front edge of the drop J. Entrance is effected from the trap H to the safe A through the opening Q. The box R is provided with a window, S, and opening, T, provided with a swinging door, U, of wire-cloth, and hooks for securing it to the end of the safe A. The opening W, in the end of the safe A, communicates with the opening T in the box R. Staples in the end of the safe A receive the hooks on the box R. The bottom of the seed-case D and the inside of the box R are lined with tin.

The operation of the invention is as follows: In the compartment of the case D, in which the opening E, provided with the wire-cloth cover F, is located, place pumpkin-seed, of which the rats are particularly fond. When this compartment is filled, the rats can see and scent the seed through the opening G in the rear side of the safe A and the opening E, which are a short distance above the drop J in the top of the rat-trap H. The corrugations in the ends of the box I enable the rats to easily climb upon the trap. In their efforts to get at the seed the rats walk over the glass plates and upon the drop J, the wall N preventing them from getting to the rear of the pivots K. The weight O is only sufficiently heavy to hold the drop J in position when no weight is on the drop in front of the pivots K. As soon as the rat steps upon the drop J it falls and precipitates the rat through the opening Q into the safe A beneath the seed-case D. As the drop J descends it strikes the spiral spring P, the glass plate L prevents the rat from clinging to the drop, and the reaction of the spring P, together with the weight O, springs the drop J back to place. The only light admitted to the safe A is through the window S in the box R. The rat instinctively seeks this point to escape, passes through the openings W and T and is imprisoned in the box R; for although the wire door U will swing to admit it, it will not swing to let it escape.

The box R can be detached at any time and the rats destroyed. The box R is provided with a movable lid, A′, secured by a screw, B′, and hook and staple, C′.

Having thus described my invention, what

I claim as new and useful, and desire to secure by Letters Patent, is—

The seed-safe A, provided with the openings G, Q, and W, and the movable seed-case C and D, the latter having the opening E covered with wire-cloth F, in combination with the box R and rat-trap H, composed of the box I, wall N, drop J, plates L M, weight O, and spring P, substantially as hereinbefore set forth.

In testimony that I claim the foregoing improvement in seed-safe and rat-trap combined, as above described, I have hereunto set my hand and seal.

SAMUEL V. GREER. [L. S.]

Witnesses:
WM. WRIGHT,
V. S. WRIGHT.